INVENTOR
JOHN MAC PHEE

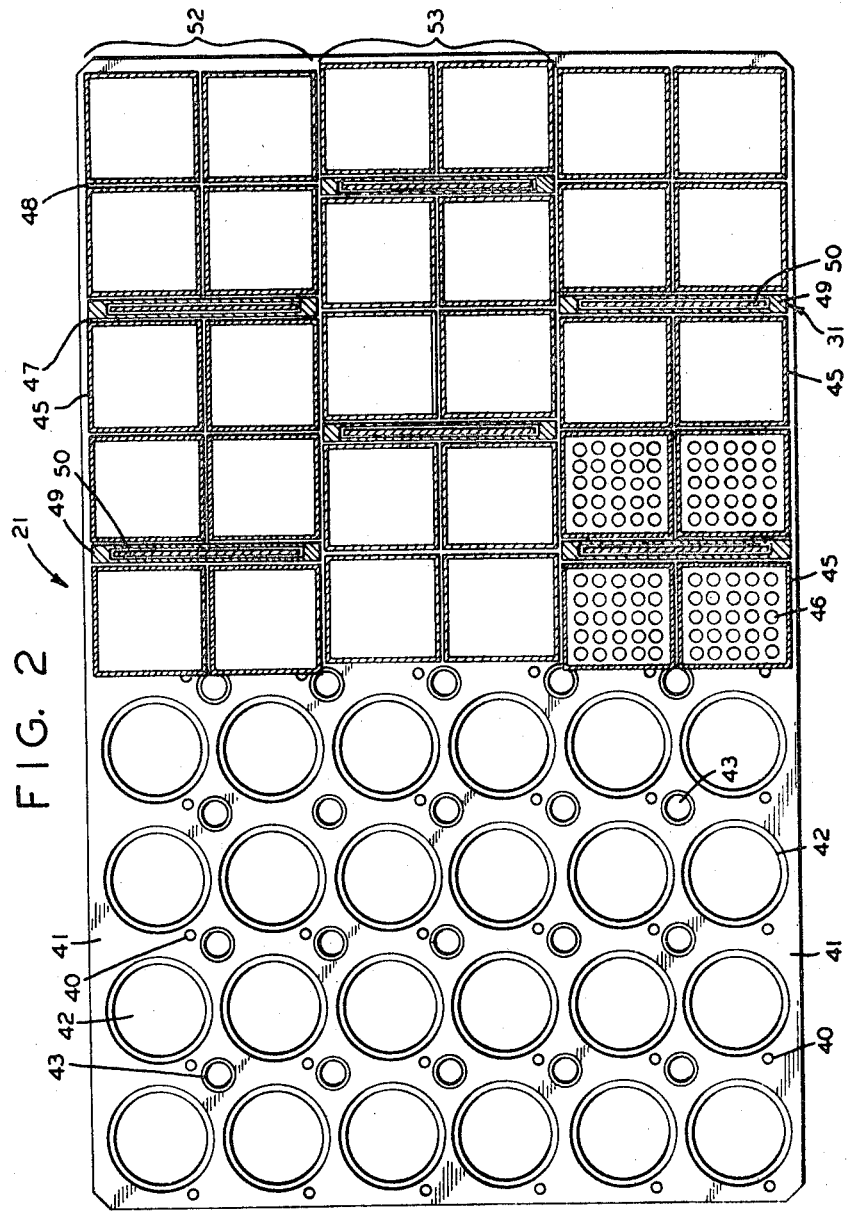

Sept. 9, 1969    J. MacPHEE    3,466,225
PULSING NUCLEAR REACTOR
Original Filed Sept. 25, 1963    4 Sheets-Sheet 3
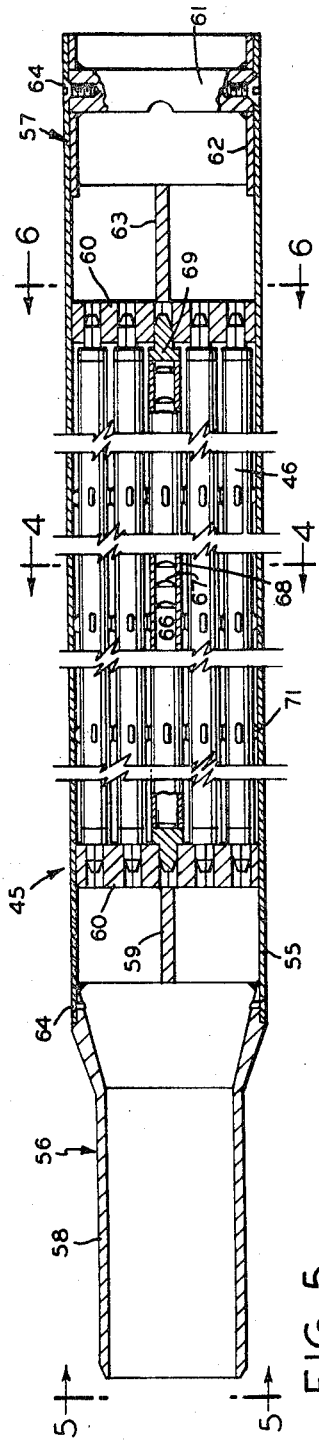
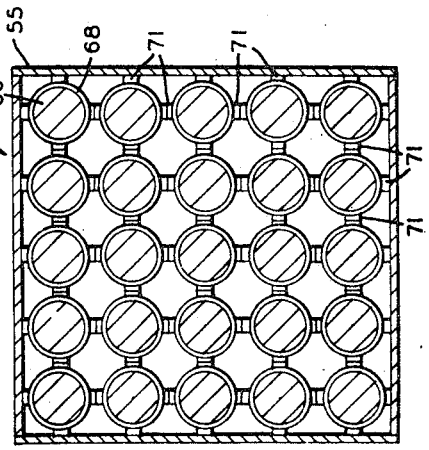
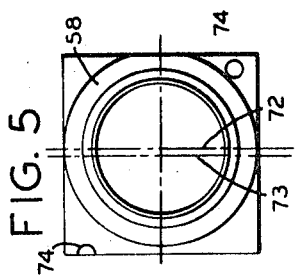
INVENTOR
JOHN MAC PHEE Sept. 9, 1969         J. MacPHEE         3,466,225
PULSING NUCLEAR REACTOR
Original Filed Sept. 25, 1963                4 Sheets-Sheet 4

INVENTOR.
JOHN MAC PHEE

United States Patent Office
3,466,225
Patented Sept. 9, 1969

3,466,225
PULSING NUCLEAR REACTOR
John MacPhee, Rowayton, Conn., assignor, by mesne assignments, to Hittman Associates, Inc., a corporation of Maryland
Original application Sept. 25, 1963, Ser. No. 311,573. Divided and this application Oct. 12, 1965, Ser. No. 594,284
Int. Cl. G21c 7/08, 3/30, 3/16
U.S. Cl. 176—62      3 Claims

ABSTRACT OF THE DISCLOSURE

This invention relates to nuclear reactors categorized as research reactors and more specifically to research reactors of the swimming pool type. In particular, the invention relates to a "pulsing" nuclear reactor which is capable of providing steady state radiation suitable for conducting experimentation by operating at one power level for relatively long periods and which is further capable of being pulsed to very high power levels to provide relatively intense bursts of radiation for shorter intervals of time. This is achieved by providing a ratio of moderating liquid to uranium dioxide present in the core so as to be sufficiently large to achieve adequate excess reactivity and sufficiently small to achieve an adequate Doppler coefficient of reactivity.

---

This application is a division of Ser. No. 311,573, filed Sept. 25, 1963, now abandoned.

In the experimentation of effects of exposure to nuclear radiation, the research reactor has become an increasingly useful tool. As technology in this art has developed, there has arisen a definite need for a research reactor which can provide short bursts of power, for example, in the 5,000 and higher megawatt range. The availability of such higher power levels in a research reactor, in addition to steady state power at lower levels, has long been desired. This need is recognized by experimenters involved with nuclear radiation and the provision of a system of this kind would be welcomed as extremely useful for many purposes, e.g. to obtain reliable data in testing weapons effects, to produce short lived isotopes in the field of medicine, as tracers, and the like.

In the present state of the art, a research type reactor which is capable of producing steady state power levels in excess of about 5–10 mw. would be impractical from the cost standpoint as well as from the standpoint of necessary incidental facilities required to operate the reactor. The availability of a pulse reactor capable of running at a relatively high steady state power level and further capable of pulsing to provide short bursts of higher power levels into this range and higher in accordance with the research reactor described by the invention, however, is practical in cost, is an extremely useful tool in practice, and is sufficiently versatile to fulfill the need long sought in the art for a unit of this capability.

It is an object of the present invention to provide an improved nuclear reactor of the open pool or tank type capable of operating at relatively high steady state power levels and of being pulsed so as to provide, upon demand, intense bursts of power for short spans of time.

It is a more specific object of the present invention to provide a pool or tank type nuclear research reactor which provides steady state power levels in the megawatt range and which upon pulsing is capable of providing short bursts of power of several orders of magnitude of the power provided by steady state operation.

It is another object of the present invention to provide a novel nuclear reactor core comprising uranium dioxide elements suitably composed and formed so as to permit the core to be pulsed and thereby imparting substantially increased advantages to the reactor.

It is still a further object of the invention to provide a novel fuel element orientation for the nuclear reactor core assembly allowing for significantly improved flexibility and avoiding the need for special fuel assemblies normally required to house control rods in assemblies of this kind.

Additional objects and advantages will become apparent as the invention is described in greated detail in conjunction with the various figures of the drawing, wherein:

FIG. 2 is a transverse section of the core taken substantially along lines 2—2 of FIG. 1 illustrating the fuel assemblies and control rod assemblies which comprise the core partially filling the grid plate.

FIG. 3 is a side view partially in section of a single fuel assembly.

FIG. 4 is a transverse sectional view taken substantially along line 4—4 of FIG. 3.

FIG. 5 is a transverse view of the fuel assembly end fitting taken substantially along line 5—5 of FIG. 3.

Figure 1:
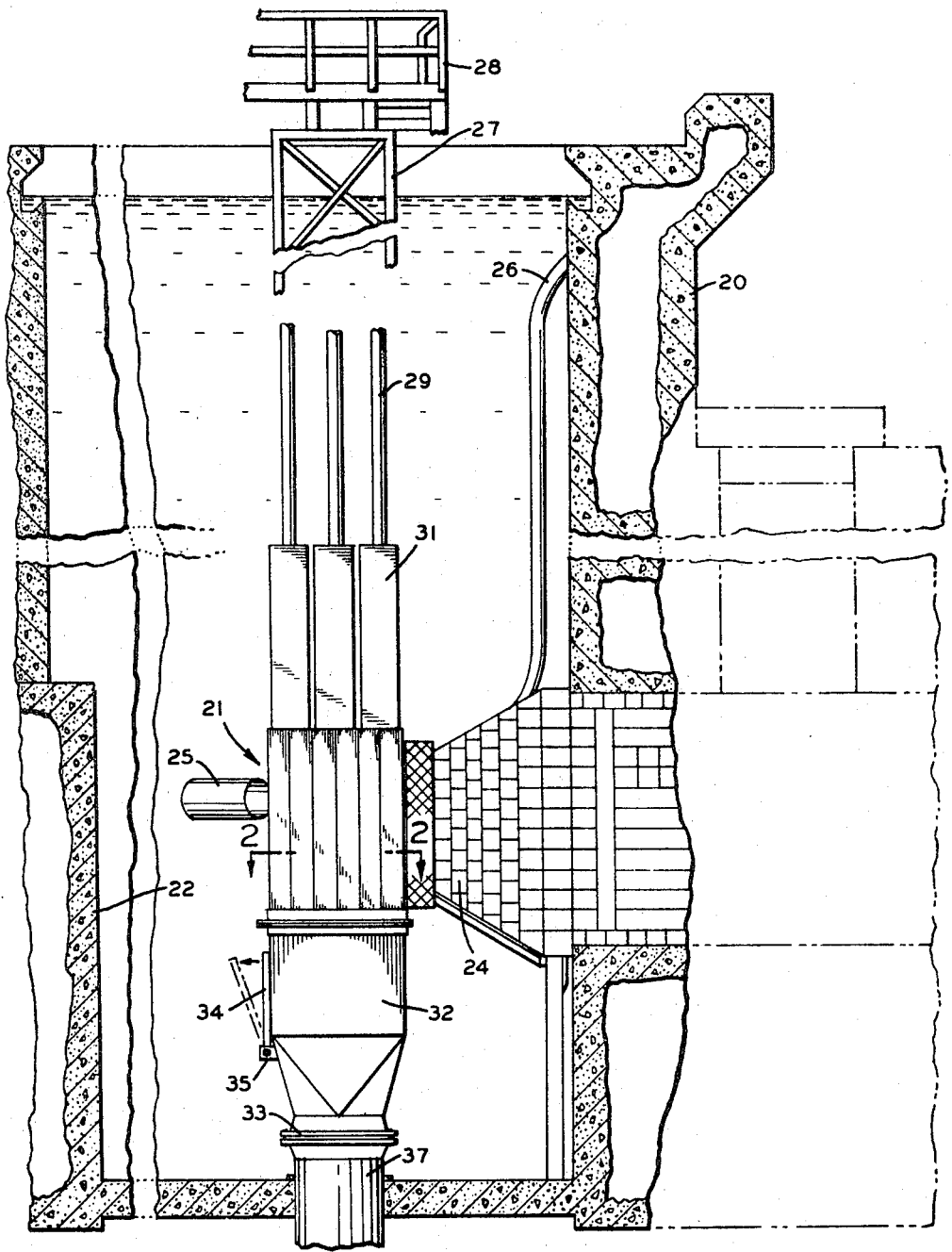
FIG. 1 is a schematic side elevational view illustrating schematically the core of the invention in relationship to various components of a conventional research reactor.

In general, the nuclear reactor provided by the present invention is characterized by being capable of operating at steady state power levels in the megawatt range and, when desired, of providing intense bursts of power, i.e., in the order of a thousand fold, by pulsing the reactor. As described herein pulsing is obtained through rapid withdrawal of a control rod although alternate means involving, for example, an arrangement which allows the rapid insertion of additional fuel over that necessary for steady state operation may be employed. As the power is increased in the pulsing stage, the resultant heating of the reactor produces automatic shutdown of the reactor.

The primary shutdown mechanism resulting from fuel heating is the increased neutron capture due to Doppler broadening in the nonfissionable uranium (U−238). (It is for this reason that fuel with a relatively low enrichment is used.) Doppler broadening is the phenomenon whereby the resonances in the capture cross section of U−238 in effect become wider as the temperature of the U−238 is increased. This is a consequence of the increase in the speed of the U−238 molecules due to increased temperature. Thus, when a reactor is pulsed by suddenly increasing reactivity, the power produced by the pulse causes heating of the fuel. This in turn results in a reduction in reactivity because of Doppler broadening. This reduction in reactivity causes the reactor to shut down. Reference is made to the following publications which consider shutdown mechanisms: "Direct Measurement of the Dynamic Doppler Coefficient by Self-Limiting Power Excursion Tests" by A. H. Spano and W. K. Ergen, Trans. American Nuclear Society, vol. 5, No. 1, pp. 157–8, 1962, and "Measurement of the Temperature Coefficient of Resonance Absorption in Uranium Metal and Uranium Oxide" by B. L. Palowitch and F. S. Franz, Nuclear Science and Engineering, 15, pp. 146–157, 1963.

The core of the reactor consists of fuel assemblies which are interchangeable with the familiar plate type aluminum-uranium alloy fuel assemblies used in the many pool typet research reactors now in use and for this reason offers the additional advantage of permitting practical conversion of existing steady state research pool reactors. The present invention distinguishes over conventional pool research reactors in that it utilizes a novel fuel assembly, which comprises a plurality of uranium dioxide pin type fuel elements. These elements are held in spaced relationship in a container of suitable metal such as a zirconium or aluminum alloy box. Each pin type fuel element is made up of uranium dioxide fuel. The invention comprises a fuel of this kind in combination with a suitable metal cladding which contains the uranium dioxide fuel. The metal which comprises the cladding is characterized by properties of high strength, high melting point and low cross section for thermal neutron capture. For this purpose, for example, zirconium cladding, preferably a zirconium-alloy suitably shaped in the form of a tube sealed at both ends has been found advantageous.

While uranium dioxide fuel compositions have been considered in power reactors, for example, as disclosed in Nucleonics, McGraw-Hill Publishing Co., Inc., March 1961, p. 58, referring to the Yankee Reactor characteristics and Nucleonics, December 1959, p. 74, referring to the Dresden reactor characteristics, utilization of fuels of this composition in the manner employed, and to give the effects produced, in the present invention was heretofore unknown. In addition to its superior pulsing capability which is achieved without compromising high steady state power capability, the assembly of uranium dioxide fuel suitably clad with metal of the properties described hereinabove as employed in the present invention prossesses additional important advantages.

Prior to a detailed disclosure of the features of the core including fuel elements, cladding, control rods, etc., reference is generally made to the arrangement of FIG. 1 in which various appurtenant elements conventional to research reactors of the pool or tank type are illustrated.

The arrangement of FIG. 1 includes a pool enclosure 20 and a core 21 contained therein. The tank or pool walls 22 adjacent to the active core 21 are formed of relatively dense concrete of the type conventionally used for this purpose such as Barytes concrete. A thermal column 24 of usual form generally comprising stacked graphite and lead shield functions as a neutron moderator to slow down fast neutrons for radiation experiments. Conventional beam tubes only one, 25, of which is illustrated radiate in horizontal direction from the reactive core. The beam tubes 25 comprise generally an aluminum liner and interior shielding blocks of canned high density concrete and lead. A pneumatic rabbit 26 comprising a concentric aluminum air line carries a sample carrier or rabbit into high neutron flux areas at the core. The facility may be equipped with suitable controls for varying the period of sample irradiation and for movement of the core to locations in the pool other than adjacent the thermal column 24.

A conventional reactor control instrument bridge 28 is suitably supported over the pool in any appropriate manner. Shown at 31 are control rods provided with extensions 29 leading to control rod actuators (not shown) on the bridge 28. Situated below the core 21 is a coolant plenum 32 leading to exhaust outlet 37 through a joint 33 which can be disconnected to permit movement of the core to the center of the pool rather than adjacent the hermal column.

Because the $UO_2$ core is designed to be compatible with existing pool reactor facilities, the fuel assemblies and control rods which comprise the core need be the only components which differ in design from a standard pool research reactor such as that of the Industrial Reactor Laboratories, Inc., situated at Plansboro, N.J., and described for example in an article entitled "The IRL 5 Mw. Reactor," appearing in the AMF Atomics publication, Research Reactor Journal, vol. II, No. 1, October 1961, or the reactor described by J. N. Anno et al., "Experience With a 1 Mw. Pool Type Research Reactor," 1958, Geneva Conference Paper, p. 422.

A core of the kind contemplated by the invention is now described in conjunction with the more detailed figures of the drawings.

FIG. 2 illustrates the core cross section comprising a grid plate 41 which is provided with a plurality of fuel assembly locating holes 42, coolant flow passage openings 43, and fuel assembly pins 40. The fuel assemblies which contain a plurality of fuel pins or elements 46 are designated 45. The grid plate 41 as illustrated is arranged to accommodate 54 fuel assemblies although this number is not critical. Contained in the grid plate 41 as shown in FIG. 2 are thirty fuel assemblies. The fuel assemblies are designed with appropriate eccentricity so that when suitably mounted they provide a plurality of wider channels designated 47 between every other row and narrower channels 48 between alternate rows. The wider channels are made to accommodate control rod assembly 31 which comprises a control rod guide 49 and a movable control rod 50. The fuel assemblies 45 are comprised of fuel elements or pins designated by 46.

Through the utilization of the fuel arrangement shown in FIGS. 2 through 5, a fuel assembly comprising a single construction may be used in the $UO_2$ core of this invention, i.e., no special configurations in the fuel elements to adapt for the accommodation of control rods is necessary. Each of the fuel elements are interchangeable in position and may be shifted so that the space for the control rods will be provided instead at the other side of a given assembly as seen by comparing the location of the rods in rows 52 and 53.

FIG. 3 is a sectional elevation of the fuel assembly 45 which consists of fuel elements or pins 46 contained in a box 55 of suitable metal or alloy normally used in the art for such applications, e.g., aluminum, magnesium, zirconium, etc. The box 55 is equipped with a lower end fitting 56 and an upper end fitting 57 each of which is secured to the box by screws 64. The lower end fitting 56 comprises a nozzle 58 for insertion into and rotating the fuel assembly in grid plate holes 42, a cruciform support 59 and a fuel element locating plate 60. The upper end fitting 57 includes a bail 61, a sleeve 62 and a cruciform hold down 63 and a fuel element locating plate 60. The bail 61 provides a means for moving the fuel assembly 45 under water with a suitably designed handling tool. The fuel element locating plates 60 maintain the spacing between fuel pins 46 and support the fuel pins. The fuel elements or pins 46 comprise fuel pellets 66 contained in the tubes or cladding 68. One end of each pellet is preferably dished 67 to minimize movement of the pellet stack due to thermal expansion. The space between pellets 66 and tubes 68 is preferably filled with a suitable gas such as helium to provide good heat transfer between the uranium dioxide pellets 66 and tube 68. The tubes are sealed by end caps 69, which are sealed preferably by welding to each end of the tube. The end caps 69 are conveniently fitted with alignment elements such as square studs which mate with holes 75 in the fuel element locating plates 60 as described in connection with FIG. 6. Spacer warts 71 are affixed to the fuel element tubes 68 to prevent fuel element bowing during pulsing although various other structural means such as ferrules may be employed to effectuate the purposes. As shown in FIGURE 4, the box 55 coupled with warts 71 serves to restrain the fuel pins 46 so that spacer warts 71 affixed to the tubes 68 touch each other and the box a relatively rigid integral network results. An interdependent support of this kind between fuel elements is important to provide optimum performance which suffers when the elements are bent from the effects of heat.

Interchangeability of the fuel elements is accomplished in the present invention by the structural configuration of elements and mountings. The center line of the end fitting or nozzle portion of the fuel assembly 45 used to position the assembly in the grid plate is eccentric with respect to the center line of the box. The end fitting also contains alignment holes which align with the locating pin in the grid plate. This arrangement makes it possible to mount the assembly in different orientations in the grid plate and eliminates the need for the special fuel assemblies used in plate type cores to house the control rods. Considerable flexibility in control rod location is achieved with this design.

The end view of the fuel assembly 45 containing the eccentric mounting arrangement is described by reference to FIG. 5 in conjunction with FIG. 3. The nozzle 58 of the lower end fitting 56 contains two alignment holes 74 which together with the locating pins 40 on the grid plate 41 enable the fuel assembly 45 to be arranged in two different orientations on the grid plate. This together with the fact that the center line 72 of the nozzle 58 is eccentric with the center line 73 of the box 55 makes it possible to provide a wide channel 47 between every other row of fuel assemblies as shown in the two upper rows 52 of fuel assemblies in FIG. 2. By rotating all fuel assemblies 180° to their alternate orientations, wide channels are provided in alternate rows as shown in the intermediate rows 53 of fuel assemblies in FIG. 2.

Figure 6:
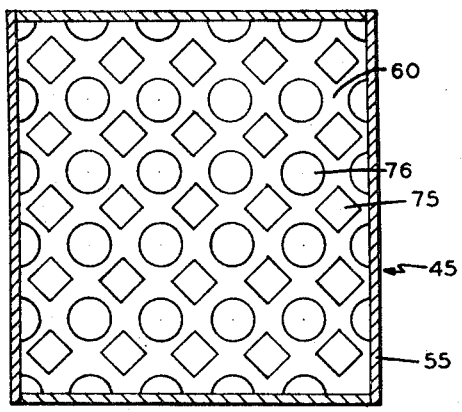
FIG. 6 is a transverse sectional view taken substantially along line 6—6 of FIG. 3.

The fuel locating plate 60 as shown in FIG. 6 contains square holes 75 which receive and orient the fuel element end caps 69 and aid in maintaining the spacing of the fuel elements by preventing rotation. Upon correct positioning of the fuel elements, the spacers 71 will touch each other. The round holes 76 in the plate 60 are provided for the passage of the coolant through the fuel assembly. It will be apparent that the various details for orienting, locating and securing the assemblies is not intended as a limitation on the invention and does not preclude alternate means which one skilled in the art may employ to effectuate comparable results.

Figure 7:
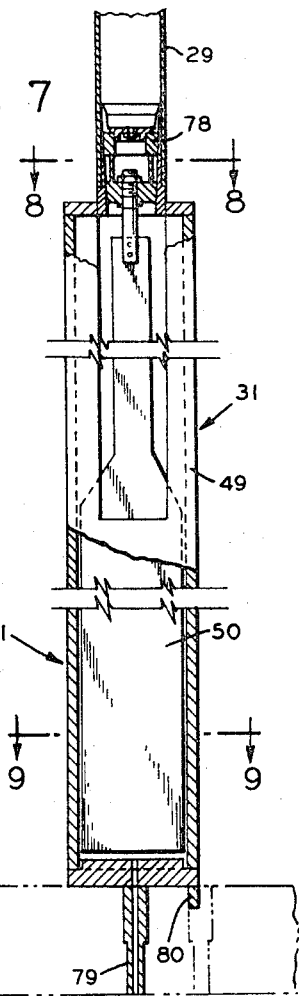
FIG. 7 is a side elevational view partially in section of a control rod assembly employed in conjunction with the reactor core of the invention.
Figure 9:
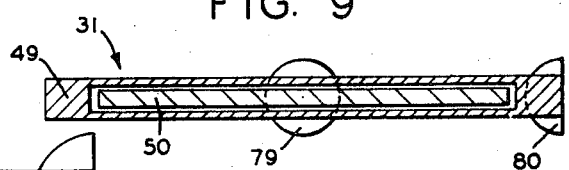
FIG. 9 is another transverse view taken substantially along line 9—9 of FIG. 7.
Figure 8:
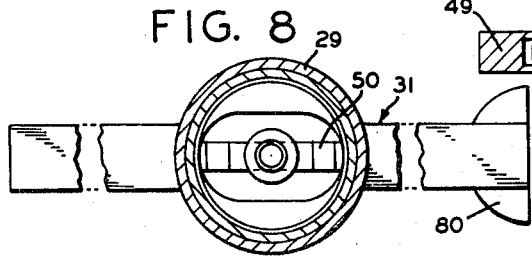
FIG. 8 is a transverse view taken substantially along line 8—8 of FIG. 7 with the piston omitted.

The control rod assembly 31 of flat blade type is illustrated in FIGS. 7–9 and comprises a guide 49 and a movable control rod 50. The control rod 50 is fastened to a shock absorber assembly 78 of the type conventionally employed for this purpose. The control rod guide 49 is equipped with locating pins 79 and 80 which are used to position the control rod assembly in grid plate holes 43. The center locating pin 79 contains a coolant passage hole in order to provide the flow of coolant past the control rod 50. FIG. 9 shows the relationship of the control rod guide 49, the control rod 50, and the locating pins 79 and 80 of control rod 31 in alternate detail. The locating pins 79 and 80 are designed to be wider than the guide 49 so that it is necessary to first remove fuel assemblies adjacent to the guide if it is desired to change the location of the control rod assembly 31 on the grid plate 41 as described in conjunction with FIG. 2.

The guide assembly functions to accurately position the control rod in the core and to shroud the rod. For this reason, the fuel assemblies need not be equipped with hold-down mechanisms. This is, because the control rod cannot touch the fuel assembly, withdrawal of the control rods cannot inadvertently withdraw adjacent fuel assemblies. The control rod is actuated by a conventional rod magnet such as one utilized in the aforementioned Industrial Reactor Laboratories, Inc., reactor and which is contained in the guide tube fastened to the top of the control rod assembly. The absorber section of the control rod is constructed of a suitable material such as cadmium sheathed in aluminum, an alloy of silver-indium-cadmium, etc.

Figure 10:
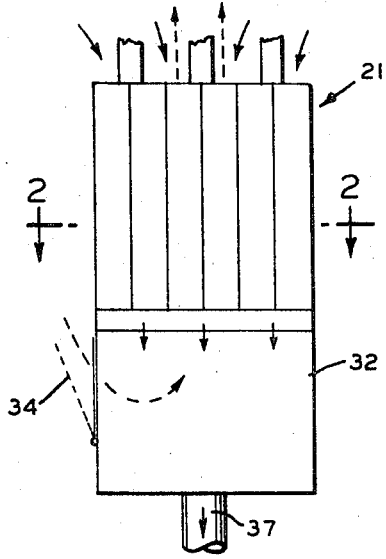
FIG. 10 is another view of the core portion illustrating alternate flow paths for the coolant around the fuel assemblies.

FIG. 10 illustrates two methods for cooling the core assembly 21. Coolant flow during normal steady state high power operation, as indicated by solid arrows, is introduced downward through the core into the outlet pipe 37, which carries it to a pump and heat exchanger, from which it is returned to the pool. The pump and heat exchanger are conventional and are of the type as shown in the Industrial Reactor Laboratories, Inc., reactor referred to hereinabove. When such forced convection cooling is provided, the flapper valve 34 is closed as shown by the solid line in FIG. 10.

The alternate cooling mode provided primarily for safety reasons is shown by the dotted arrows in FIG. 10. In this alternate natural convection mode, the flapper valve 34 swings open as shown in dotted lines in FIG. 10 when the coolant circulating pump is turned off. Coolant flow is provided by the heating of the coolant in the core assembly 21. While this mode of coolant is not suitable for high power steady state operation, it provides certain advantages for pulsed operation. This use of natural convection flow provides a means, alternate to the Doppler effect for shutting down the reactor following a pulse. Shut down occurs because of the existence of a coolant temperature coefficient of reactivity and the large coolant temperature rise which results with natural convection cooling.

The utilization of $UO_2$ as fuel in the form and application herein presented for the purpose of providing power pulses in research reactors provide certain heretofore unknown advantages over other forms known in the art even though this fuel composition has been available. For example, a uranium dioxide-graphite matrix combination, which is known in the art and described by G. A. Freund et al., "TREAT, A Pulsed Graphite-Moderated Reactor for Kinetic Experiments," 1958, Geneva Conference Paper P/1848, is not suitable for use in a pool reactor because the coefficient of reactivity in an element of this character is reduced below a workable level by the pool liquid. A reactor core having fuel of this kind must be gas cooled in order to achieve an adequate temperature coefficient of reactivity. With gas cooling, a reactor using this fuel would not be capable of high steady state power operation and would not be practical as a pool reactor.

A uranium-zirconium hydride matrix, on the other hand such as that disclosed by S. L. Kotz et al., "Design of a 10 Kw. Reactor for Isotope Production, Research and Training Purposes," 1958, Geneva Conference Paper P/1017, although in more readily available form, has a relatively high diffusivity making it unattractive for a reactor with capabilities of high steady state power as well as pulsing operation. That is, to obtain the relatively long fuel time constant required for pulsing (to prevent rapid cooling of the fuel following a pulse), rather large fuel lumps of a zirconium hydride matrix must be used. This results in a low surface to mass ratio for the fuel, and consequently, restricts steady state power operation because the amount of heat transfer surface available is relatively quite small. The difficulty of reprocessing zirconium hydried fuel and the fact that this compound is fairly reactive, also contributes to the rejection of this type of matrix. A comparison of a research reactor size uranium dioxide core in accordance with the invention compared to other systems discloses significant quantitative reasons for its superior ability to operate in both a steady state and pulsed mode, namely:

(1) The heat capacity of such a core is extremely high; so high in fact as to make pulses of at least 100 megawatt-seconds feasible. This is much higher than a core utilizing zirconium hydride for example and can be explained by comparing the properties of $UO_2$ with zirconium hydride. The specific heat of $UO_2$ is approximately the same as zirconium hydride on a volume basis. However, the maximum permissible temperature rise in $UO_2$ is much greater than in zirconium hydride. Consequently, the heat capacity and hence permissible pulse energy in a $UO_2$ core of equal matrix volume is about five times greater than in a zirconium hydride core.

(2) The thermal diffusivity of $UO_2$ is quite low. For example, it is about one-tenth the value of the diffusivity of zirconium hydride. As a result, for a given fuel time constant the diameter of a $UO_2$ fuel pin need only be about one-third the diameter of a comparable zirconium hydride fuel pin. Consequently, sufficient heat transfer surface can be provided in a $UO_2$ core for steady state operation at power levels of 5 megawatts or more.

(3) An adequate fuel temperature coefficient of reactivity (required to produce shelf-shutdown in the pulse mode) due to the Doppler effect primarily can be achieved by a proper selection of the ratio of $UO_2$ to water in the core. This has been confirmed by a review of data obtained from typical power reactors utilizing $UO_2$ fuel and is not comparably available with other fuel.

The chemical stability of uranium dioxide, its good corrosion resistance, the mass of data developed in connection with power reactor fuel (see for example "Uranium Dioxide: Properties & Nuclear Applications" by J. Belle, USAEC, 1961), the large number of commercial organizations capable of fabricating such fuel, and the relatively economical fuel cost lend further advantages to the utilization of uranium dioxide for the fuel matrix as proposed by the present invention.

Uranium dioxide in the form of pellets or like aggregates is preferably employed over other less integral forms in that under present technology it offers a margin of safety over forms such as powdered or granular uranium dioxide on the basis that, for example, rupture of a fuel pin containing powdered uranium dioxide could result in a high energy disposition rate in the coolant which may give rise to rather high pressures which could result in further fuel pin damage. By using pellets on the other hand, for example, the fuel will more likely remain in relatively large lumps even in the unlikely event of cladding rupture. Additionally, pellets provide a much higher degree of fission product retention. However, the use of such other forms is not precluded.

In the fabrication of the core of the present invention, the selection of the water to uranium dioxide volume ratio in the core is important. The criticality of this ratio has been ascertained through a parametric study. Increasing the water to uranium dioxide ratio reduces the age of the core and hence increases the excess reactivity. However, in order to obtain a large negative Doppler coefficient of reactivity which is necessary to permit pulsing, a large amount of resonance absorption is required (i.e., a low resonance escape probability is required). This is achieved by reducing the water to uranium dioxide ratio. Thus, the final water to uranium dioxide ratio selected represents a balance between reactivity and Doppler coefficient requirements. The ratio should be selected in the system of the present invention so as to be sufficiently large to achieve adequate excess reactivity and sufficiently small to achieve an adequate Doppler coefficient of activity. In general, the volumetric ratio of water to uranium dioxide should be chosen so that the Doppler coefficient is large enough to permit pulse operation at pulse levels of more that about 2,000 megawatts. In the composition of the core when a zirconium alloy cladding, e.g. zirconium alloys of more than 90% zirconium with small amounts, less than 2% of tin, and lesser amounts of iron chromium and nickel are used, e.g., Zircaloy-2 available from Westinghouse Electric Corp., a water to uranium dioxide ratio between 1.0:1.6 to 2:1, is generally suitable. Preferably a ratio between 1:1 and 1.6:1 is employed. A ratio of about 1.2 gives rise to a relatively high neutron temperature which results in a particularly preferred relatively hard high energy neutron spectrum in the core. Taken in conjunction with the heavy fuel loading, this results is a relatively short prompt neutron lifetime of 20 microseconds which is highly desirable in order to obtain sharp pulses.

The results afforded by the invention are surprisingly advantageous in that it could not be expected that a research reactor embodying the above preferred water to uranium dioxide ratio would be useful for research. Such a reactor would typically comprise a fuel loading of 20 kg. of $U^{235}$, whereas the conventional swimming pool research reactor comprises a typical fuel loading of 4 kg. It would then appear that the useful neutron flux available from the $UO_2$ core compared to that available from the conventional core would be inversely proportioned to these fuel loadings at a given power level (a rule of thumb is that flux in the fuel is directly proportioned to power level and inversely proportional to fuel loading). However, calculations performed on a typical $UO_2$ core have shown that the useful flux levels outside the fuel are comparable to those in a conventional reactor even though the flux levels in the $UO_2$ fuel are indeed lower.

While various cladding materials for uranium dioxide have been employed in the past, it is necessary in the present invention that the cladding metal, if it is to be effective to suitably produce sharp effective pulses, must have a combination of physical properties of (a) high strength, (b) high melting point, and (c) low cross section for thermal neutron capture. Metal cladding comprising zirconium for example provides the capability of steady state and pulsing. Alternate metals or alloys possessing these three combined physical properties may also be employed while other metals are unsuitable. For example, the comparative advantage of zirconium over aluminum and stainless steel cladding during pulsing was investigated by calculating the transient temperature distributions in the fuel elements. The results indicated that aluminum cladding is relatively inferior because of high thermal stresses and the low melting point of the material.

Stainless steel while of prima facie interest because of its low fabrication cost and high melting point, is productive of relatively high thermal stresses during pulsing. For example, it is understood that tests on a uranium dioxide core designed solely for pulsing were limited due to the thermal stress in stainless steel cladding. Work in which stainless steel cladding has been considered is described by A. H. Spano, "Self-Limiting Power Excursion Tests of a Water-Moderated Low Enrichment $UO_2$ Core," Nuclear Science & Engineering, pp. 15, 37-51, 1963.

The transient calculations for zirconium-clad fuel elements indicated that zirconium is superior in thermal performance both in terms of thermal stress and melting point. Physics calculations performed on cores using these three different cladding materials i.e., aluminum, steel and zirconium, unquestionably determined the desirability of zirconium over the alternates stainless steel and aluminum as the cladding material for reactivity reasons. The high cross-section of stainless steel makes it impossible to construct a practical core using this cladding material in a relatively large water to uranium ratio is required to obtain the necessary excess reactivity. If a large water to uranium ratio is used, the pulsing capability of the core is severely limited by a very small Doppler coefficient of reactivity. A zirconium clad core can be made quite dry to achieve a high negative Doppler coefficient of reactivity and yet have sufficient excess reactivity for operation as a research reactor.

A research reactor designed in accordance with the invention is readily capable of steady state operation on a 5 megawatt level and higher. At the 5 megawatt level a coolant flow rate of about 3400 gallons per minute is employed. The corresponding heat flux is less than about 400,000 b.t.u. per hour per square foot. At a steady state power level of 2 megawatts on the other hand, the required coolant flow rate is only about 1200 gallons per minute and the maximum heat flux is approximately 160,000 b.t.u. per hour per square foot. Thus, it is evident that the reactor core of the present invention retains the steady state power capability found in the more conventional plate type pool reactor cores.

The capability of the core for operations at about 5 megawatts is important even when it is intended to limit power level for example to 1 megawatt. In such instances, the reactor will be completely safe in that fuel melting will not occur if the entire pool were drained. This is not true of cores utilizing relatively large fuel lumps such as required with a uranium-zirconium hydride matrix.

By way of example, the pulsing performance of the reactor core of the invention is illustrating based on the relatively conservative maximum fuel temperature of 1470° F. which is approximately one-half the sintering temperature of the uranium dioxide. Even at this modest rating, a very large pulse of 40 megawatt-sec. and a peak power of 2,000 megawatt is obtainable. Similarly, for a temperature limit equal to the sintering temperature, i.e., approximately 3000° F., an extremely intense pulse of approximately 90 megawatt-sec and 10,000 megawatts is achieved. Pulses having peak power of even greater value are of course not precluded.

An important advantage of the reactor core composition of the invention is due to the fact that this type of fuel can be obtained from a number of commercial fabricators now in existence. Thus a reactor user will not be restricted to a sole source of fuel. Another advantage based on experience through use of this fuel in power reactors is that the use of low enriched oxide fuel as employed by the invention in a research reactor will result in lower annual fuel operating costs as compared to using conventional research reactor plate type fuel which utilizes highly enriched uranium. Moreover, fuel reprocessing does not pose a problem as facilities for reprocessing oxide fuel now exist. Still another important advantage of this new type of research reactor core is that it more closely simulates the nuclear environment of many power reactor technology. Additionally, the present invention does not remove the basic flexibility of which is now attributed as a significant advantage of pool type research reactors. Another major benefit of the invention is that existing pool reactors can be converted to pulsing facilities at a relatively low cost.

A pulsed reactor of the kind provided by this invention is particularly useful in producing short-lived isotopes for medical research, in studying the transient effects of radiation on electronic and similar equipment as well as biological specimens, and in evaluating damage caused by nuclear weapons. It is also useful in developing components and materials for nuclear rockets.

While the present invention has been described with reference to a number of specific details, it will be apparent that various modifications may be effected by those skilled in the art without departing from the contribution provided by the invention. Accordingly, it is contemplated that the invention encompass all modifications that fall within the purview of the appended claims.

What I claim is:

1. A nuclear research reactor capable of steady state power level and upon demand capable of providing relatively high power levels for short intervals, comprising a pool of moderating water, a central active core in said pool which includes a plurality of fuel elements of uranium dioxide fissionable material having a cladding and disposed within a supporting grid plate in an array, secured in fixed spaced relationship by means of metal warts extending from said cladding and adapted to support a chain reaction of neutron induced fissions, said array being spaced and disposed in a chamber wherein moderating water is circulated in heat exchange relationship with said fuel elements, a control rod arranged so as to be interposingly removable from its position between said fuel elements and in operable relationship with said fuel elements, means for permitting steady state operation when said control rod is positioned between the fuel elements and effect pulse operation upon withdrawal of said control rod from its position between said array of the fuel elements.

2. A nuclear reactor: a pool of moderating liquid, a central active core in said pool comprising a plurality of assemblies of uranium dioxide fissionable fuel elements contained in a zirconium alloy cladding said assemblies comprising a plurality of uranium dioxide rods secured in spaced fixed relationship in a metal container and disposed within a supporting grid plate in an array adapted to support a chain reaction of neutron induced fissions, each assembly being equipped with an eccentric end fitting for securing in said grid plate to offset said assembly sufficient to accommodate a control rod between alternate fuel assemblies, said array of rods being spaced and disposed in a chamber permitting moderating liquid to be circulated through said chamber in heat exchange relationship therewith, control rods arranged in conjunction with the eccentrically fitting fuel rod assemblies so as to be interposingly positioned within said fuel assemblies and in operable relationship with said fuel assemblies, and means for permitting introduction and withdrawal of said control rods from within said array of the fuel assemblies.

3. In the nuclear reactor of claim 2 wherein the rods of uranium dioxide fissionable material comprise pellets having a concave end to allow for expansion as said fuel is subjected to increased temperature.

References Cited
UNITED STATES PATENTS

| | | | |
|---|---|---|---|
| 2,982,713 | 5/1961 | Sankovich et al. | 176—61 |
| 2,992,176 | 7/1961 | Schoessow | 176—62 X |
| 3,081,246 | 3/1963 | Edlund | 176—18 |
| 3,127,325 | 3/1964 | Taylor et al. | 176—62 |
| 3,212,988 | 10/1965 | Ringot | 176—67 |
| 3,243,350 | 3/1966 | Lustman et al. | 176—67 X |

REUBEN EPSTEIN, Primary Examiner

U.S. Cl. X.R.

176—34, 66, 67, 81